United States Patent
Yeh et al.

(10) Patent No.: US 8,284,572 B2
(45) Date of Patent: Oct. 9, 2012

(54) CURRENT CONTROL METHOD AND APPARATUS

(75) Inventors: Wen-Chung Yeh, Hsin-Chu (TW); Ren-Yi Chen, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 728 days.

(21) Appl. No.: 12/275,201

(22) Filed: Nov. 20, 2008

(65) Prior Publication Data

US 2010/0124080 A1    May 20, 2010

(51) Int. Cl.
*H02M 3/335* (2006.01)
(52) U.S. Cl. .................... 363/21.12; 363/21.18
(58) Field of Classification Search ..... 363/21.12–21.18
See application file for complete search history.

(56) References Cited

U.S. PATENT DOCUMENTS

| | | | |
|---|---|---|---|
| 6,674,656 B1 * | 1/2004 | Yang et al. | 363/21.18 |
| 7,030,670 B2 * | 4/2006 | Lin | 327/170 |
| 2003/0043601 A1 * | 3/2003 | Balakrishnan et al. | 363/21.12 |
| 2003/0048645 A1 * | 3/2003 | Hosotani et al. | 363/21.12 |

* cited by examiner

*Primary Examiner* — Jue Zhang
(74) *Attorney, Agent, or Firm* — Winston Hsu; Scott Margo (57) ABSTRACT

Current control method and apparatus are disclosed. A current limiter is coupled to a switch connected in series with an energy transfer element of a power supply. The current limiter detects a current flowing through the switch and, when the current exceeds a current limit signal, turns off the switch. A limit signal generator provides the current limit signal, detects the maximum current value of the current, and updates the current limit signal according to the maximum current value and an ideal current limit value.

4 Claims, 10 Drawing Sheets

CURRENT CONTROL METHOD AND APPARATUS

BACKGROUND OF THE INVENTION

1. Field of the Invention

The present invention relates to a power supply, and more particularly, to a current control apparatus and method employed in a power supply for limiting a maximum current.

2. Description of the Prior Art

The technology of pulse width modulation has been widely applied to a variety of switching power supplies for controlling or regulating output power. In order to avoid permanent damage occurring to a power supply, the power supply is normally embedded with protection circuits such as an over-voltage protection circuit, an over-current protection circuit, and so forth. In general, the power supply is also installed with a protection mechanism for limiting output power regarding overloading or output shorting situations.

Figure 1:
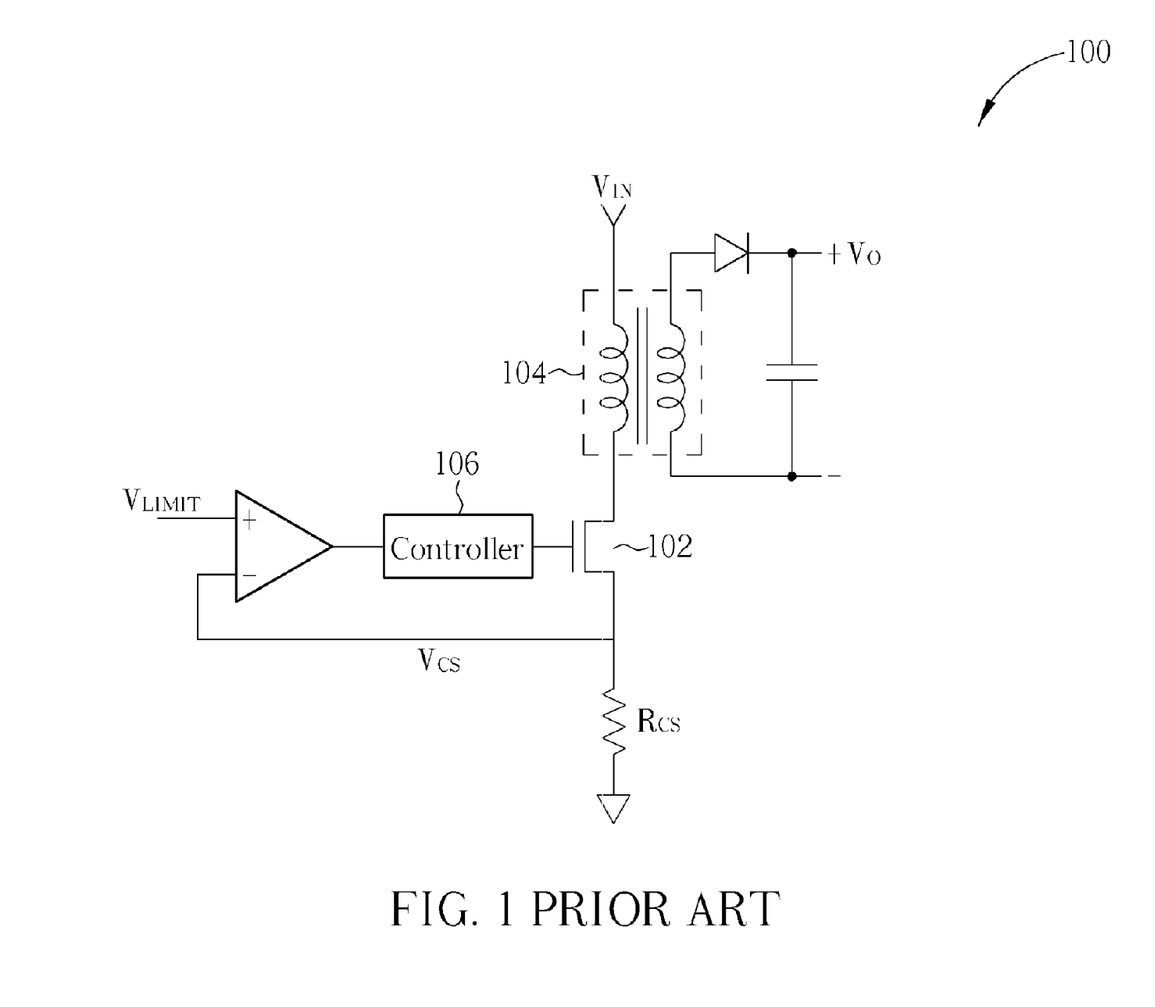
FIG. 1 is a schematic diagram showing a prior-art pulse width modulation (PWM) power supply.

Please refer to FIG. 1, which is a schematic diagram showing a prior-art pulse width modulation (PWM) power supply 100. Controller 106 functions to generate a PWM signal for controlling on/off states of a power switch 102. When power switch 102 is turned on, a power voltage $V_{IN}$ will charge the primary winding of transformer 104 making the current increase gradually flowing through the primary winding. When power switch 102 is turned off, the energy stored in transformer 104 can be released for charging an output capacitor via the secondary winding. Resistor $R_{CS}$ is connected with power switch 102 in series, so that voltage drop $V_{CS}$ across resistor $R_{CS}$ is corresponding to the current flowing through power switch 102 and/or the primary winding. When voltage drop $V_{CS}$ is greater than or equal to a predetermined value such as the value of current limit signal $V_{LIMIT}$, the current, flowing through power switch 102 and/or the primary winding, is then estimated to be an over current. Under such over-current situation, controller 106 will turn off power switch 102 to cease the current flowing through the primary winding. In other words, current limit signal $V_{LIMIT}$ can be utilized to put a limit of maximum power output to operation of the PWM power supply 100.

However, if current limit signal $V_{LIMIT}$ is set as a constant, the maximum output power may change in response to a variation of power voltage $V_{IN}$ due to an occurrence of signal propagation delay. When voltage drop $V_{CS}$ is greater than or equal to the value of current limit signal $V_{LIMIT}$, a signal delay time $t_{DELAY}$ is required for the controller 106 to complete turning off the power switch 102. In the process during the signal delay time $t_{DELAY}$, the current flowing through the primary winding is still increasing, and the growth amount of the current is approximately proportional to the contemporary voltage level of power voltage $V_{IN}$. That is, the maximum power output is actually increased following the increase of power voltage $V_{IN}$.

Figure 2:
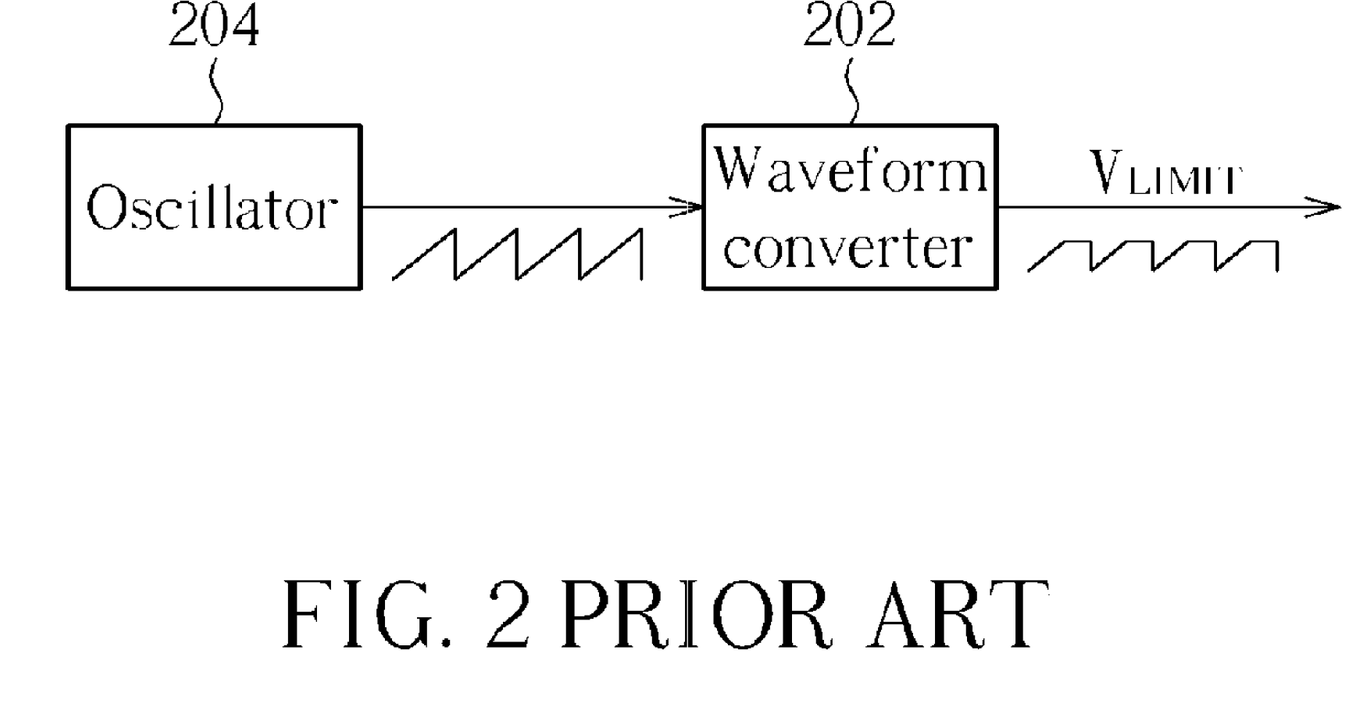
FIG. 2 presents a schematic diagram briefing a methodological construct regarding the '656 patent.
Figure 3:
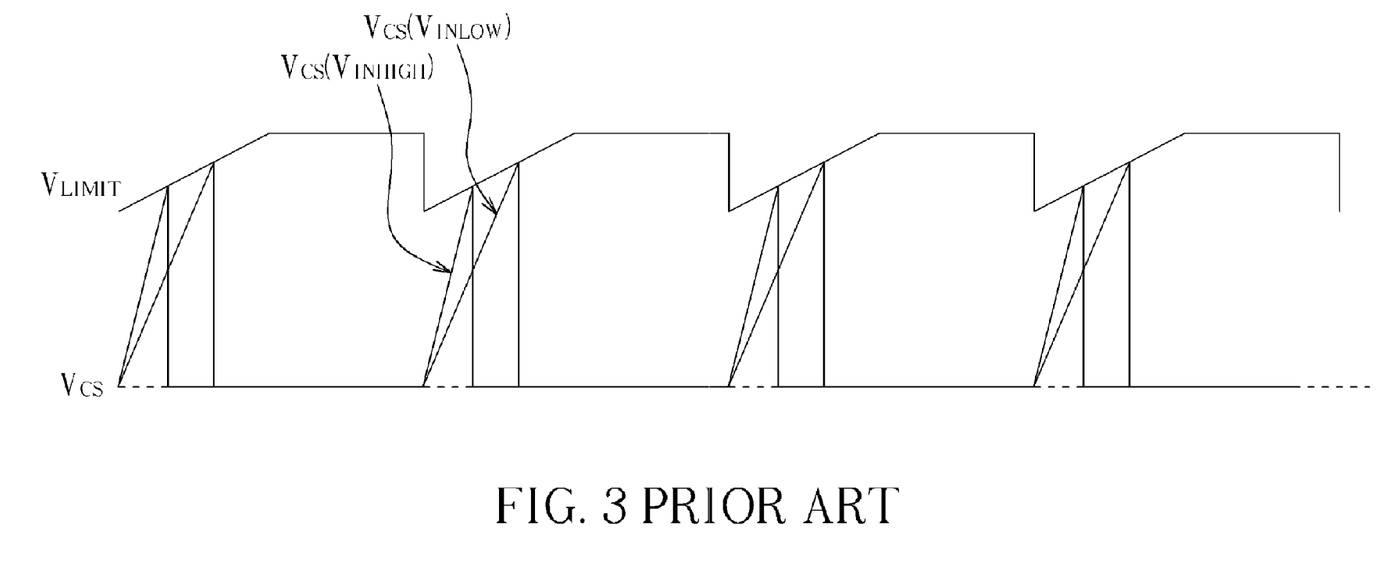
FIG. 3 illustrates the waveforms regarding the current limit signal $V_{LIMIT}$ and two different voltage drops $V_{CS}$ generated in accordance with an embodiment of the '656 patent.

A solution of the aforementioned problem is provided by Yang et al. in U.S. Pat. No. 6,674,656 filed on Oct. 28, 2002, entitled "PWM controller having a saw-limiter for output power limit without sensing input voltage", which is referred to as '656 patent hereinafter. FIG. 2 presents a schematic diagram briefing a methodological construct regarding the '656 patent. In the methodological construct provided by the '656 patent, current limit signal $V_{LIMIT}$ is not a constant. A saw-tooth signal generated by oscillator 204 is furnished to waveform converter 202. Waveform converter 202 then performs slope-adjusting, clamping, and level-shifting operations on the saw-tooth signal for generating current limit signal $V_{LIMIT}$ as shown in FIG. 2. The value of current limit signal $V_{LIMIT}$ is changing with time during each period. As shown in FIG. 2, during each period, the value of current limit signal $V_{LIMIT}$ is rising from a lowest voltage and is eventually clamped at a highest voltage. FIG. 3 illustrates the waveforms regarding current limit signal $V_{LIMIT}$ and two different voltage drops $V_{CS}$ generated in accordance with an embodiment of the '656 patent. Referring to FIG. 3, the waveform of $V_{CS}(V_{INHIGH})$ represents the waveform of voltage drop $V_{CS}$ corresponding to a higher power voltage $V_{IN}$, and the waveform of $V_{CS}(V_{INLOW})$ represents the waveform of voltage drop $V_{CS}$ corresponding to a lower power voltage $V_{IN}$. Based on the waveforms shown in FIG. 3, it is obvious that the slope of voltage drop $V_{CS}(V_{INHIGH})$ is higher as the corresponding power voltage $V_{IN}$ is higher. Accordingly, when the power voltage $V_{IN}$ is higher, voltage drop $V_{CS}(V_{INHIGH})$ is rising quickly so as to reach a lower voltage of current limit signal $V_{LIMIT}$, and the problem of unstable maximum output power, resulting from the occurrence of signal propagation delay, can be roughly solved.

SUMMARY OF THE INVENTION

In accordance with an embodiment of the present invention, a current control method is provided. The current control method comprises turning on a switch connected in series with an energy transfer element of a power supply; providing a current limit signal and an ideal current limit value; detecting a current flowing through the switch; turning off the switch when the current exceeds the current limit signal; detecting a maximum current value of the current; and updating the current limit signal according to the maximum current value and the ideal current limit value.

An embodiment of the present invention provides a current control apparatus comprising a current limiter and a limit signal generator. The current limiter is electrically coupled to a switch which is connected in series with an energy transfer element of a power supply. The current limiter functions to detect a current flowing through the switch and to turn off the switch when the current exceeds a current limit signal. The limit signal generator is utilized for providing the current limit signal, detecting a maximum current value of the current, and updating the current limit signal according to the maximum current value and an ideal current limit value.

An embodiment of the present invention provides a current control method. The current control method comprises turning on a switch during a period, the switch being connected in series with an energy transfer element of a power supply; detecting a current flowing through the switch when the switch is turned on; providing a current limit signal; and turning off the switch when the current exceeds the current limit signal. The current limit signal is substantially retained to be a fixed value during the period. The current limit signal is updated according to a current detection result during the period; in turn, the current limit signal updated is put in use for a subsequent period.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 4:
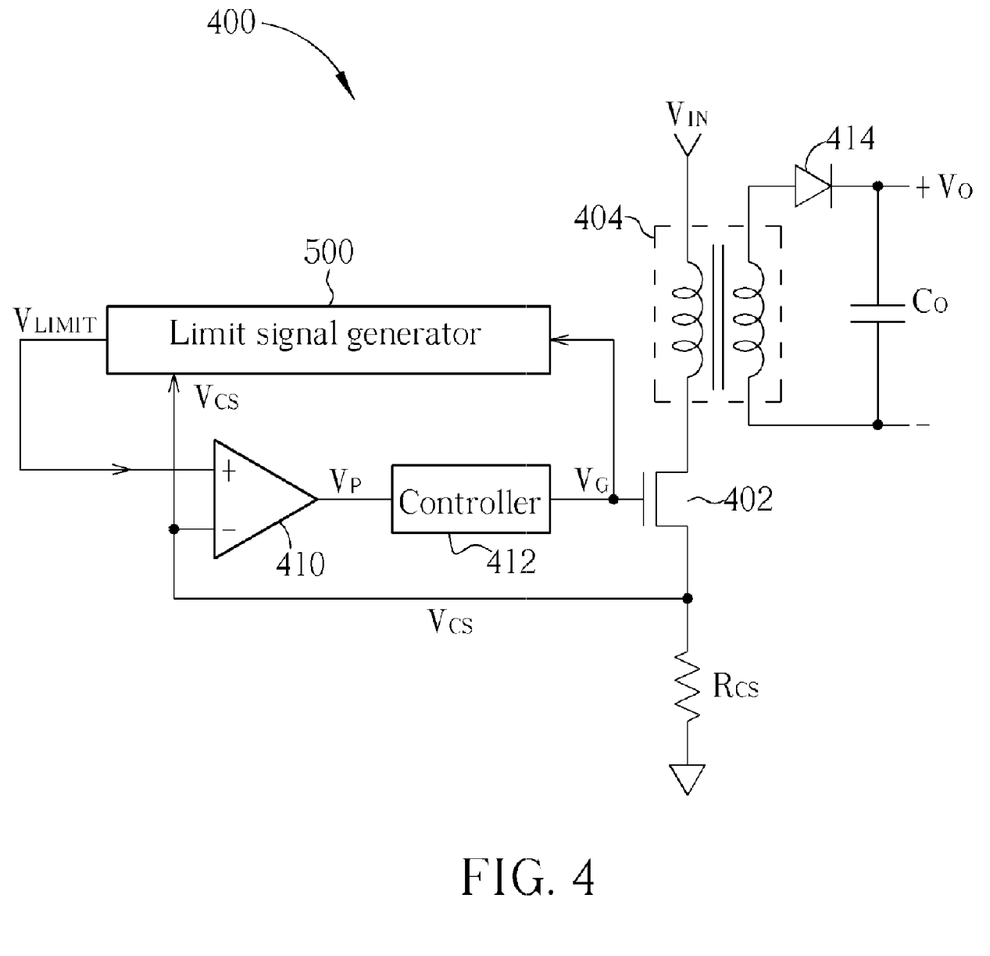
FIG. 4 is a circuit diagram schematically showing a power supply in accordance with an embodiment of the present invention.

FIG. 4 is a circuit diagram schematically showing a power supply in accordance with an embodiment of the present invention. Power supply 400 is a flyback power converter comprising a power switch 402, a transformer 404, a limit signal generator 500, a comparator 410, a controller 412, a resistor $R_{CS}$, a diode 414, and a rectification load capacitor $C_O$. Controller 412 provides a control signal $V_G$ so as to control on/off states of power switch 402 for enabling charging or discharging operation of transformer 404. Resistor $R_{CS}$ is utilized for detecting the current flowing through the primary winding of transformer 404 so as to control the output power of power supply 400. Limit signal generator 500 functions to generate a current limit signal $V_{LIMIT}$. The detailed explanation on limit signal generator 500 will be set forth later on. Comparator 410 generates a compare signal $V_P$ through comparing current limit signal $V_{LIMIT}$ with voltage drop $V_{CS}$ across resistor $R_{CS}$. Controller 412 controls the operation of power switch 402 according to compare signal $V_P$ generated by comparator 410.

Limit signal generator 500 is employed to detect a maximum value of $V_{CS}$, corresponding to a maximum value of the current flowing through power switch 402, in the present period so as to generate current limit signal $V_{LIMIT}$ for using in a subsequent period. In other words, limit signal generator 500 is able to update the current limit signal $V_{LIMIT}$ period by period, and the current limit signal $V_{LIMIT}$ is substantially retained to be a fixed value while power switch 402 is turned on.

Figure 5:
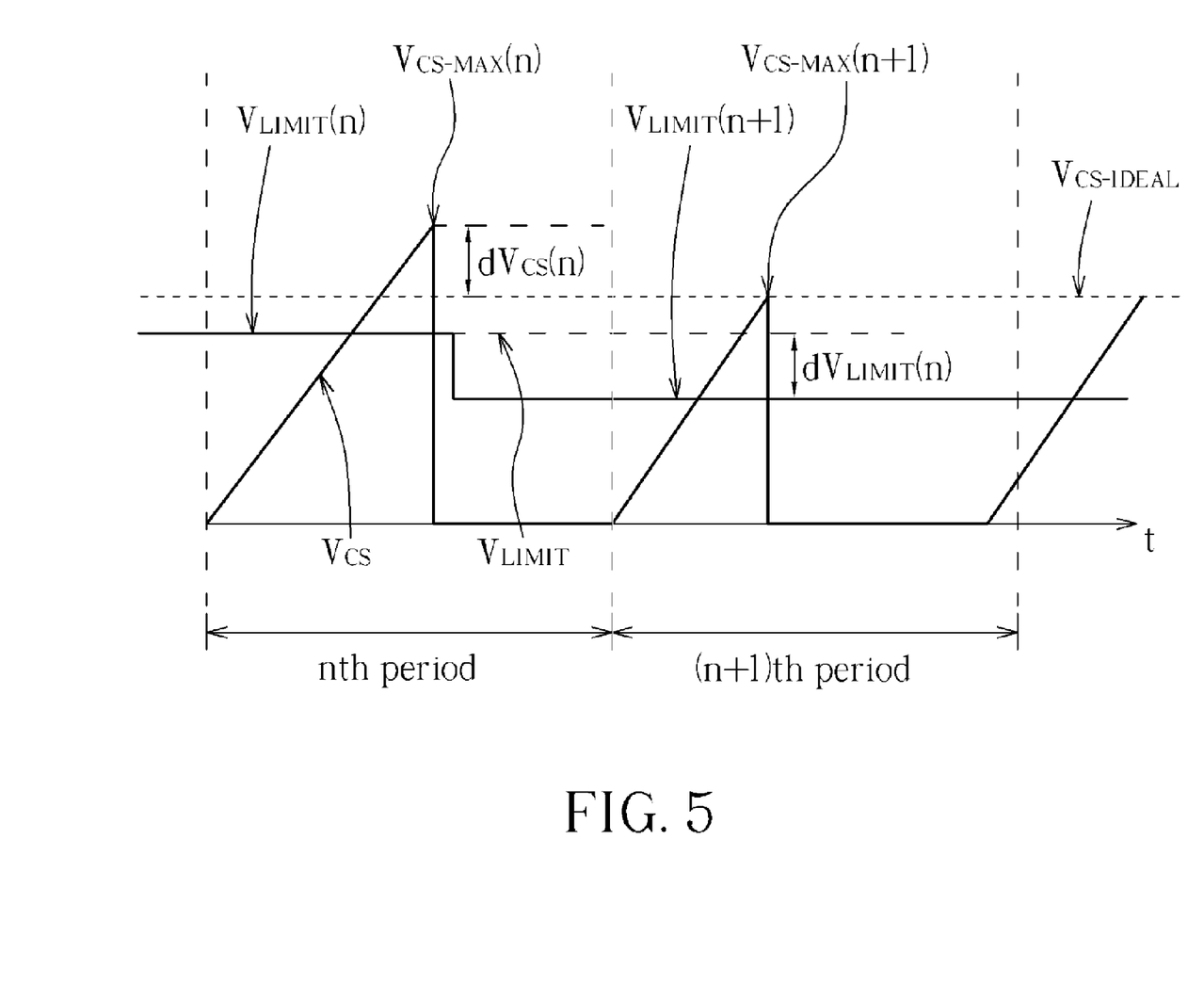
FIG. 5 is a signal schematic diagram showing the voltage drop $V_{CS}$ and the current limit signal $V_{LIMIT}$ generated by the limit signal generator shown in FIG. 4 during nth and (n+1)th periods, having time along the abscissa.

FIG. 5 is a signal schematic diagram showing the voltage drop $V_{CS}$ and the current limit signal $V_{LIMIT}$ generated by the limit signal generator shown in FIG. 4 during nth and (n+1)th periods, having time along the abscissa. Referring to FIG. 5, $V_{CS\text{-}MAX}(n)$ represents a current peak value of the current flowing through power switch 402 during the nth period, $V_{LIMIT}(n)$ represents a reference value used for limiting the current flowing through power switch 402 during the nth period, $V_{CS\text{-}IDEAL}$ represents an ideal current limit value of the current flowing through power switch 402, $dV_{CS}(n)$ represents the resulted difference between the current peak value $V_{CS\text{-}MAX}(n)$ and the ideal current limit value $V_{CS\text{-}IDEAL}$, i.e. $dV_{CS}(n)=V_{CS\text{-}MAX}(n)-V_{CS\text{-}IDEAL}$; and $dV_{LIMIT}(n)$ represents an update difference between the reference value $V_{LIMIT}(n)$ and the reference value $V_{LIMIT}(n+1)$, i.e. $dV_{LIMIT}(n)=V_{LIMIT}(n)-V_{LIMIT}(n+1)$.

As shown in FIG. 5, after reaching the reference value $V_{LIMIT}(n)$ in the nth period, voltage drop $V_{CS}$ keeps rising, rather than immediately falling off, until reaches the current peak value $V_{CS\text{-}MAX}(n)$ due to signal propagation delay. The current peak value $V_{CS\text{-}MAX}(n)$ is greater than the ideal current limit value $V_{CS\text{-}IDEAL}$, implying that the reference value $V_{LIMIT}(n)$ used in the nth period is too high for limiting the current flowing through power switch 402. Accordingly, if the reference value $V_{LIMIT}(n+1)$ for use in the (n+1)th period is reduced, the current peak value $V_{CS\text{-}MAX}(n+1)$ in the (n+1)th period will be reduced closer to the ideal current limit value $V_{CS\text{-}IDEAL}$. For instance, if the resulted difference $dV_{CS}(n)$ ($=V_{CS\text{-}MAX}(n)-V_{CS\text{-}IDEAL}$) is directly put in use as the update difference $dV_{LIMIT}(n)$ for generating the reference value $V_{LIMIT}(n+1)$, the current peak value $V_{CS\text{-}MAX}(n+1)$ is then expected to be approximately equal to the ideal current limit value $V_{CS\text{-}IDEAL}$ as illustrated in the (n+1)th period shown in FIG. 5. [Para 27] In view of that, the reference value $V_{LIMIT}$ is updated periodically in accordance with an embodiment of the present invention, and the update difference $dV_{LIMIT}(n)$ for using in each updating process is proportional to the resulted difference $dV_{CS}(n)$. The adjusted reference value $V_{LIMIT}(n+1)$ for use in the (n+1)th period can be expressed as Formula (1) listed below.

$$V_{LIMIT}(n+1) = V_{LIMIT}(n) - k \times dV_{CS}(n) \qquad \text{Formula (1)}$$
$$= V_{LIMIT}(n) - k \times (V_{CS-MAX}(n) - V_{CS-IDEAL})$$

In Formula (1), k represents a proportion. Accordingly, the difference between the current peak value $V_{CS\text{-}MAX}(n+1)$ and the reference value $V_{LIMIT}(n+1)$ is expected to be the same as the difference between the current peak value $V_{CS\text{-}MAX}(n)$ and the reference value $V_{LIMIT}(n)$. For that reason, the current peak value $V_{CS\text{-}MAX}(n+1)$ can be expressed as Formula (2) listed below.

$$V_{CS-MAX}(n+1) = V_{LIMIT}(n+1) + (V_{CS-MAX}(n) - V_{LIMIT}(n)) \qquad \text{Formula (2)}$$

Substitute the expression of Formula (1) for the reference value $V_{LIMIT}(n+1)$ in Formula (2), and the current peak value $V_{CS\text{-}MAX}(n+1)$ can be expressed as Formula (3) listed below.

$$V_{CS-MAX}(n+1) = V_{CS-MAX}(n) - k \times (V_{CS-MAX}(n) - V_{CS-IDEAL}) \qquad \text{Formula (3)}$$
$$= (1-k) \times V_{CS-MAX}(n) + k \times V_{CS-IDEAL}$$

Based on Formula (3), a plurality of corresponding expressions can be deduced as the followings.

$$V_{CS-MAX}(1) = (1-k)V_{CS-MAX}(0) + kV_{CS-IDEAL}$$

$$V_{CS-MAX}(2) = (1-k)V_{CS-MAX}(1) + kV_{CS-IDEAL}$$

$$= (1-k)^2 V_{CS-MAX}(0) + ((1-k)k + k) \times V_{CS-IDEAL}$$

...

$$V_{CS-MAX}(n) = (1-k)^n V_{CS-MAX}(0) + [1 - (1-k)^n] \times V_{CS-IDEAL}$$

When $|1-k|<1$, the current peak value $V_{CS-MAX}(n)$ will approach the ideal current limit value $V_{CS-IDEAL}$ following an increase of n. That is, the final stable value of current peak value $V_{CS-MAX}(n)$ is ensured to be locked to the ideal current limit value $V_{CS-IDEAL}$ regardless of any initial value such as $V_{LIMIT}(0)$ or $V_{CS-MAX}(0)$. Accordingly, as long as the circuit of the embodiment is able to generate the relationship based on Formula (1) and the proportion k is set to be within a range between 0 and 2, the current peak value $V_{CS-MAX}(n)$ will be eventually locked to the ideal current limit value $V_{CS-IDEAL}$ regardless of any preset initial value $V_{LIMIT}(0)$. However, with the aim of speeding a converging process for generating the final stable value of current peak value $V_{CS-MAX}(n)$, the proportion k is better set to be within a range between 0.5 and 1.5. In a preferred embodiment, the proportion k is assigned to be 1 so that the current peak value $V_{CS-MAX}(1)$ becomes the ideal current limit value $V_{CS-IDEAL}$ immediately after a starting period.

Figure 6:
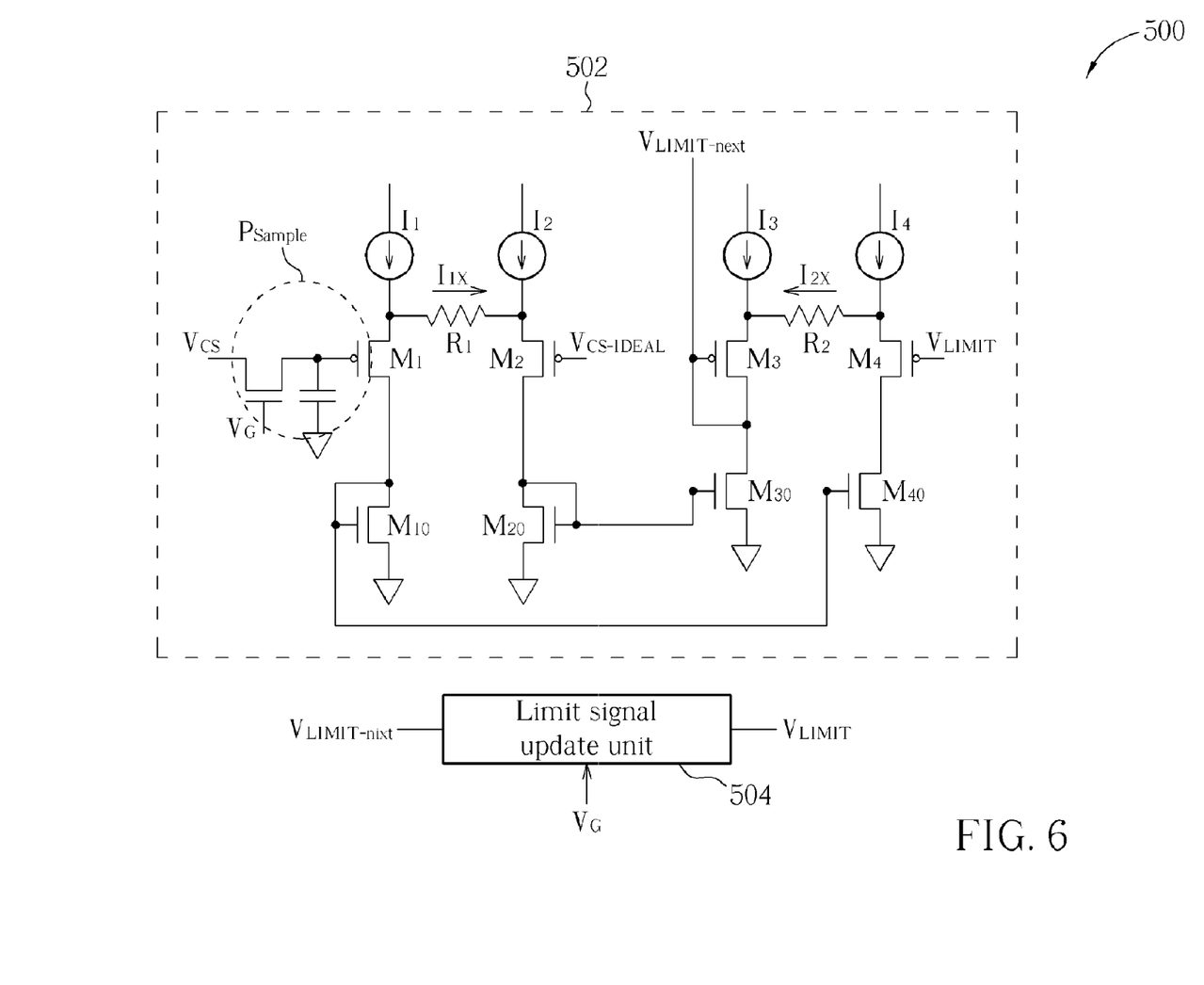
FIG. 6 is a schematic diagram showing an embodiment of the limit signal generator in FIG. 4 for generating the reference value $V_{LIMIT}(n+1)$.

FIG. 6 is a schematic diagram showing an embodiment of the limit signal generator in FIG. 4 for generating the relationship based on Formula (1). As shown in FIG. 6, limit signal generator 500 comprises a correction signal generator 502 and a limit signal update unit 504. Correction signal generator 502 detects the voltage drop $V_{CS}$ as well as the current limit signal $V_{LIMIT}$ and functions to generate a correction signal $V_{LIMIT-next}$ based on the current limit signal $V_{LIMIT}$ before updated, the detected peak value of voltage drop $V_{CS}$, and the ideal current limit value $V_{CS-IDEAL}$. Limit signal update unit 504 is used to update the current limit signal $V_{LIMIT}$ based on the correction signal $V_{LIMIT-next}$.

In the operation of correction signal generator 502, the currents $I_1$ and $I_2$ have substantially the same current value, and the currents $I_3$ and $I_4$ also have substantially the same current value. MOS transistors $M_{30}$ and $M_{20}$ are coupled to form a current mirror so that the current ratio of currents flowing through MOS transistors $M_{30}$ and $M_{20}$, a current ratio m, is substantially equal to that of currents $I_3$ and $I_2$. Also, the MOS transistors $M_{40}$ and $M_{10}$ are coupled to form another current mirror, thus the current ratio of currents flowing through MOS transistors $M_{40}$ and $M_{10}$ is substantially equal to that of currents $I_4$ and $I_1$ and is expected to be the current ratio m, too.

Correction signal generator 502 comprises a peak value sampler $P_{sample}$. When limit signal generator 500 is working during an nth period and power switch 402 is turned off by control signal $V_G$, the voltage retained in the capacitor of peak value sampler $P_{sample}$ will be equal to the current peak value $V_{CS-MAX}(n)$.

MOS transistor $M_1$ is configured to be part of a source follower. Therefore, when the current peak value $V_{CS-MAX}(n)$ is retained in the capacitor of peak value sampler $P_{sample}$, the left end of resistor $R_1$ is expected to have the voltage equal to the summation of the current peak value $V_{CS-MAX}(n)$ and the threshold voltage $V_{th-M1}$ of MOS transistor $M_1$.

Similarly, the voltage at the right end of resistor $R_1$ is expected to be the summation of the ideal current limit value $V_{CS-IDEAL}$ and the threshold voltage $V_{th-M2}$ of MOS transistor $M_2$. The threshold voltage $V_{th-M2}$ is about the same as the threshold voltage $V_{th-M1}$. Under such situation, the current flowing through resistor $R_1$ becomes $I_{1x}=(V_{CS-MAX}(n)-V_{CS-IDEAL})/R_{10}$. $R_{10}$ is the resistance of resistor $R_1$.

The current $I_{1x}$ also represents the current difference between the currents flowing through MOS transistors $M_1$ and $M_2$, i.e. the current difference between the currents flowing through MOS transistors $M_{10}$ and $M_{20}$. Based on the circuit operation regarding the aforementioned current mirrors, the current $I_{2x}$ flowing through resistor $R_2$ is expected to be proportional to the current $I_{1x}$, i.e. $I_{2x}=m \times I_{1x}$ and m is the current ratio.

The right end of resistor $R_2$ will have the summation voltage of the reference value $V_{LIMIT}(n)$ and the threshold voltage $V_{th-M4}$ of MOS transistor $M_4$. Suppose that the resistance of resistor $R_2$ is $R_{20}$ and the threshold voltage of MOS transistor $M_3$ is $V_{th-M3}$. Based on the above description, the correction signal $V_{LIMIT-next}$ can be expressed as Formula (4) listed below.

$$V_{LIMIT-next} = V_{LIMIT}(n) + V_{th-M4} - I_{2x} \times R_{20} - V_{th-M3} \quad \text{Formula (4)}$$

$$\cong V_{LIMIT}(n) - R_{20}/R_{10} \times m \times (V_{CS-MAX}(n) - V_{CS-IDEAL})$$

Figure 7:
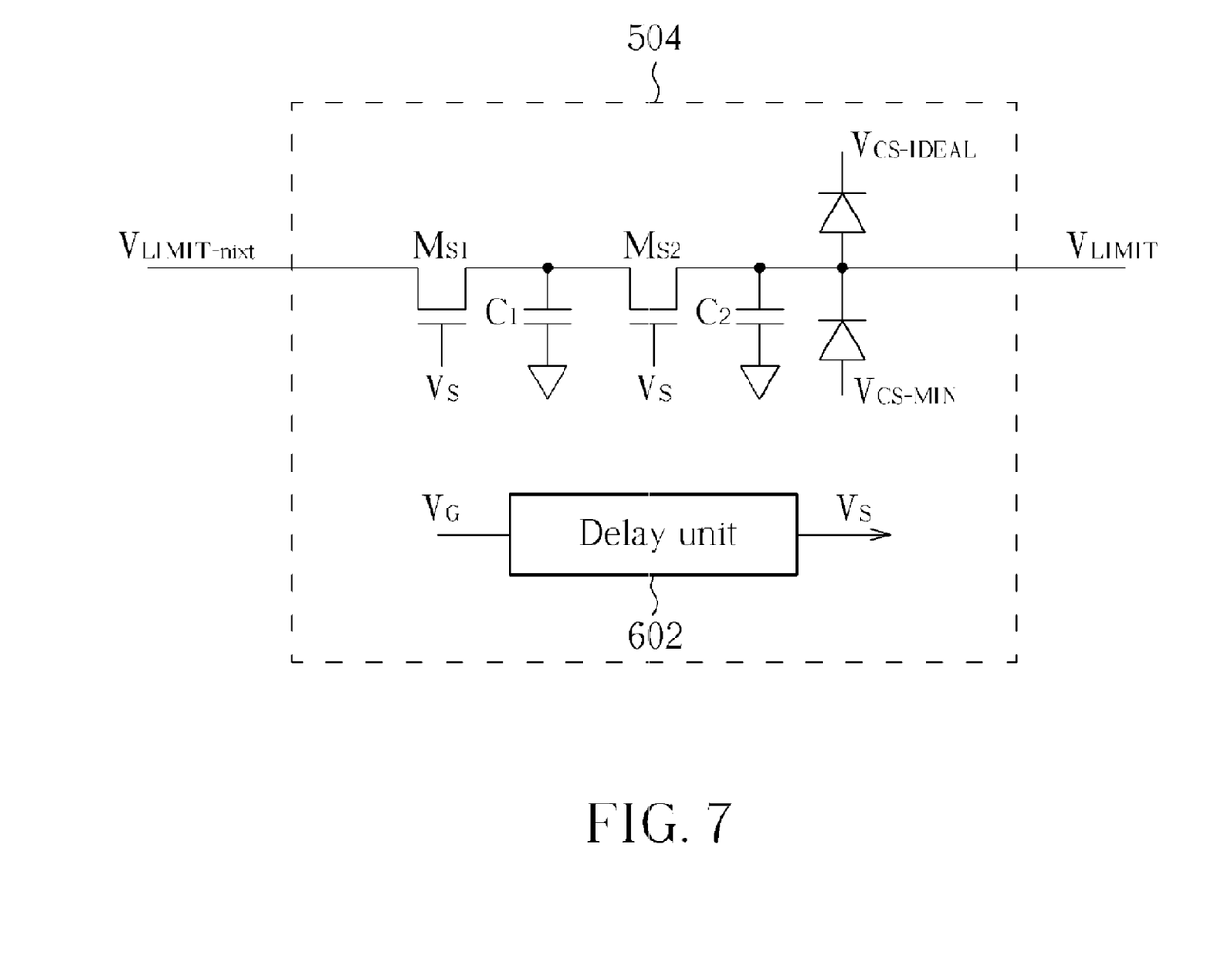
FIG. 7 is a schematic diagram showing an embodiment of the limit signal update unit in FIG. 6 for updating the current limit signal $V_{LIMIT}$ base on the correction signal $V_{LIMIT\text{-}next}$ and the control signal $V_G$.

FIG. 7 is a schematic diagram showing an embodiment of the limit signal update unit in FIG. 6. Referring to FIG. 7, Limit signal update unit 504 employs a delay unit 602 for generating a signal $V_S$ by delaying the control signal $V_G$ with a delay time dt. After power switch 402 has been turned on by the control signal $V_G$ for a while, the signal $V_S$ turns on MOS transistor $M_{S1}$ and turns off MOS transistor $M_{S2}$. Then after the power switch 402 is turned off by the control signal $V_G$, MOS transistor $M_{S1}$ will keep turned on and MOS transistor $M_{S2}$ will keep turned off by the signal $V_S$ for a while. Accordingly, the correction signal $V_{LIMIT-next}$ is retained at a memory end of capacitor C1, and the reference value $V_{LIMIT}(n)$ of current limit signal $V_{LIMIT}$ regarding the present period is retained at a memory end of capacitor C2. The delay time dt is required to be long enough so that the current peak value $V_{CS-MAX}(n)$ is capable of affecting the correction signal $V_{LIMIT-next}$ sufficiently to satisfy Formula (4). Accordingly, at the delay time dt after power switch 402 is turned off by the control signal $V_G$, the signal $V_S$ will turn off the MOS transistor $M_{S1}$ and turn on the MOS transistor $M_{S2}$ to update the current limit signal $V_{LIMIT}$ based on the correction signal $V_{LIMIT-next}$ so that the reference value $V_{LIMIT}(n+1)$ for using in the next period can be generated and retained at the memory end of capacitor $C_2$. Suppose that the capacitance of capacitor $C_1$ is $C_{10}$ and the capacitance of capacitor $C_2$ is $C_{20}$. Based on a capacitor charge sharing rule and Formula (4), the reference value $V_{LIMIT}(n+1)$ can be expressed as Formula (5) listed below.

$$V_{LIMIT}(n+1) = V_{LIMIT}(n) - R_{20}/R_{10} \times m \times C_{10}/(C_{10}+C_{20}) \times (C_{CS-MAX}(n) - V_{CS-IDEAL}) \quad \text{Formula (5)}$$

Compare Formula (5) with Formula (1), it is obvious that the peak value of voltage drop $V_{CS}$ can be definitely converged to the ideal current limit value $V_{CS-IDEAL}$ after experiencing several switching periods as long as the value of $R_{20}/R_{10} \times m \times C_{10}/(C_{10}+C_{20})$ falls into the range between 0 and 2, preferable of 1, in the embodiment, achieving the purpose of limiting the current flowing through power switch 402. Besides, the resistors and capacitors used in the circuit of the embodiment are not required to have accurate values and the required aforementioned resistor/capacitor-related ratios have a relatively wide acceptable range. Accordingly, it is quite easy to implement the circuit layout of the embodiment.

Please continue referring to FIG. 7, limit signal update unit 504 further employs two ideal diodes for clamping the value of current limit signal $V_{LIMIT}$ to be within a range between the ideal current limit value $V_{CS-IDEAL}$ and a preset minimum value $V_{CS-MIN}$ so as to solve any potential problem caused by the peak value of voltage drop $V_{CS}$ going beyond a predetermined range before the convergence of current limit signal $V_{LIMIT}$.

In summary, the embodiment of the present invention is able to update the current limit signal $V_{LIMIT}$ period by period, and the peak value of voltage drop $V_{CS}$ can be accurately locked to the ideal current limit value $V_{CS-IDEAL}$. Furthermore, the circuit embodiment of the present invention can be easily implemented while the resistors and capacitors used are not required to have accurate resistances and capacitances.

In the embodiment shown in FIG. 6, the updating process for updating the current limit signal $V_{LIMIT}$ is performed once during each turn-on and turn-off operation cycle of power switch 402, regardless of whether the current flowing through the power switch is an over current. For that reason, the present invention further provides another embodiment for performing an updating process once only when an over current flowing through the power switch occurs during one turn-on and turn-off operation cycle of power switch 402. For instance, in one embodiment, the control signal $V_G$ in FIG. 6 and FIG. 7 can be replaced with a signal $V_{G'}$ generated by performing an AND operation on the control signal $V_G$ and the compare signal $V_P$ shown in FIG. 4.

Accordingly, when the ideal current limit value $V_{CS-IDEAL}$ is a fixed value, an embodiment of the present invention is able to limit the maximum current flowing through the power switch to a corresponding fixed value for solving the aforementioned problem caused by signal propagation delay.

However, based on the embodiment shown in FIG. 4, an output current $I_O$, forwarded from the rectification load capacitor $C_O$ to a load, may change in accordance with the change of power voltage $V_{IN}$ even though the maximum current flowing through power switch 402 is limited to a corresponding fixed value. For instance, when power supply 400 is operated in a continuous conduction mode (CCM) and the output voltage $V_O$ is a preset value, the average output current $I_O$ is likely to change following a change of power voltage $V_{IN}$.

In other embodiments of the present invention, the ideal current limit value $V_{CS-IDEAL}$ may not be a fixed value. That is, the ideal current limit value $V_{CS-IDEAL}$ may change with time or period by period.

Figure 8:
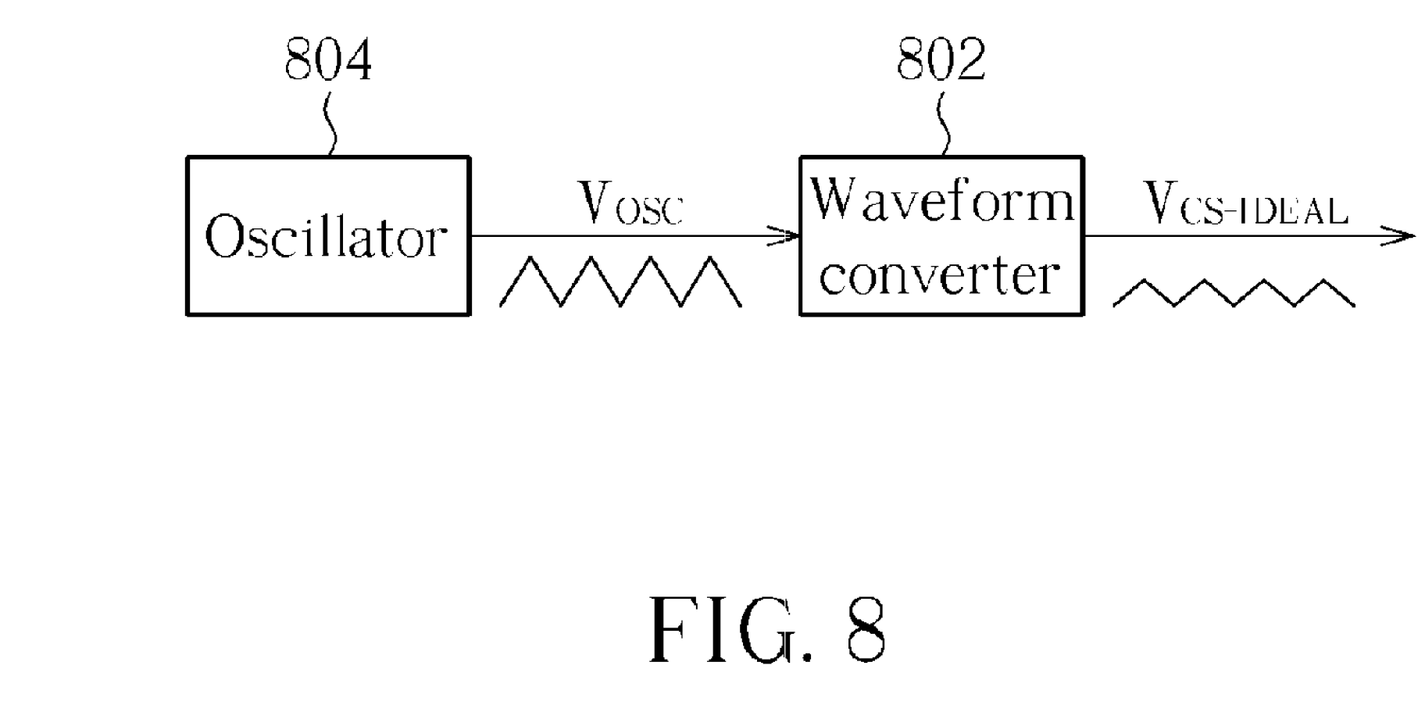
FIG. 8 is a schematic diagram showing a mechanism for generating the ideal current limit value $V_{CS\text{-}IDEAL}$ in accordance with an embodiment of the present invention.
Figure 9:
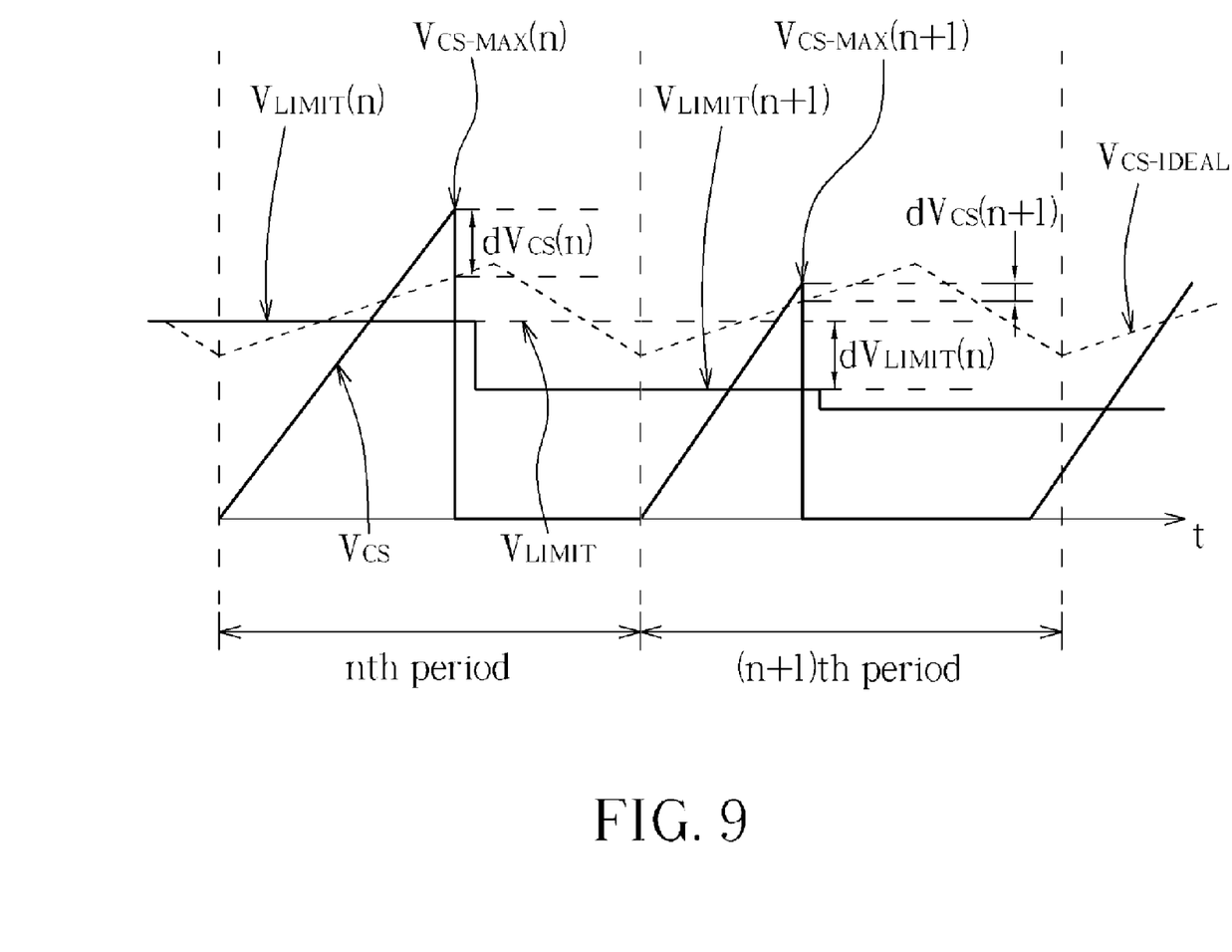
FIG. 9 is a signal schematic diagram showing the waveform of ideal current limit value $V_{CS\text{-}IDEAL}$ corresponding to the embodiment shown in FIG. 8 during nth and (n+1)th periods, having time along the abscissa.

FIG. 8 is a schematic diagram showing a mechanism for generating the ideal current limit value $V_{CS-IDEAL}$ in accordance with an embodiment of the present invention. Referring to FIG. 8, oscillator 804 is employed to provide an oscillation signal $V_{OSC}$, such as a saw-tooth signal or a triangular signal, forwarded to waveform converter 802 for generating the ideal current limit value $V_{CS-IDEAL}$ forwarded to the gate of MOS transistor $M_2$ shown in FIG. 6. Waveform converter 802 can be implemented based on but not limited to the disclosed embodiment of the '656 patent. FIG. 9 is a signal schematic diagram showing the waveform of ideal current limit value $V_{CS-IDEAL}$ corresponding to the embodiment shown in FIG. 8. As shown in FIG. 9, the ideal current limit value $V_{CS-IDEAL}$ increases with time during at least part of an interval when the power switch is turned on in each period regardless of the nth period or the (n+1)th period.

Figure 10:
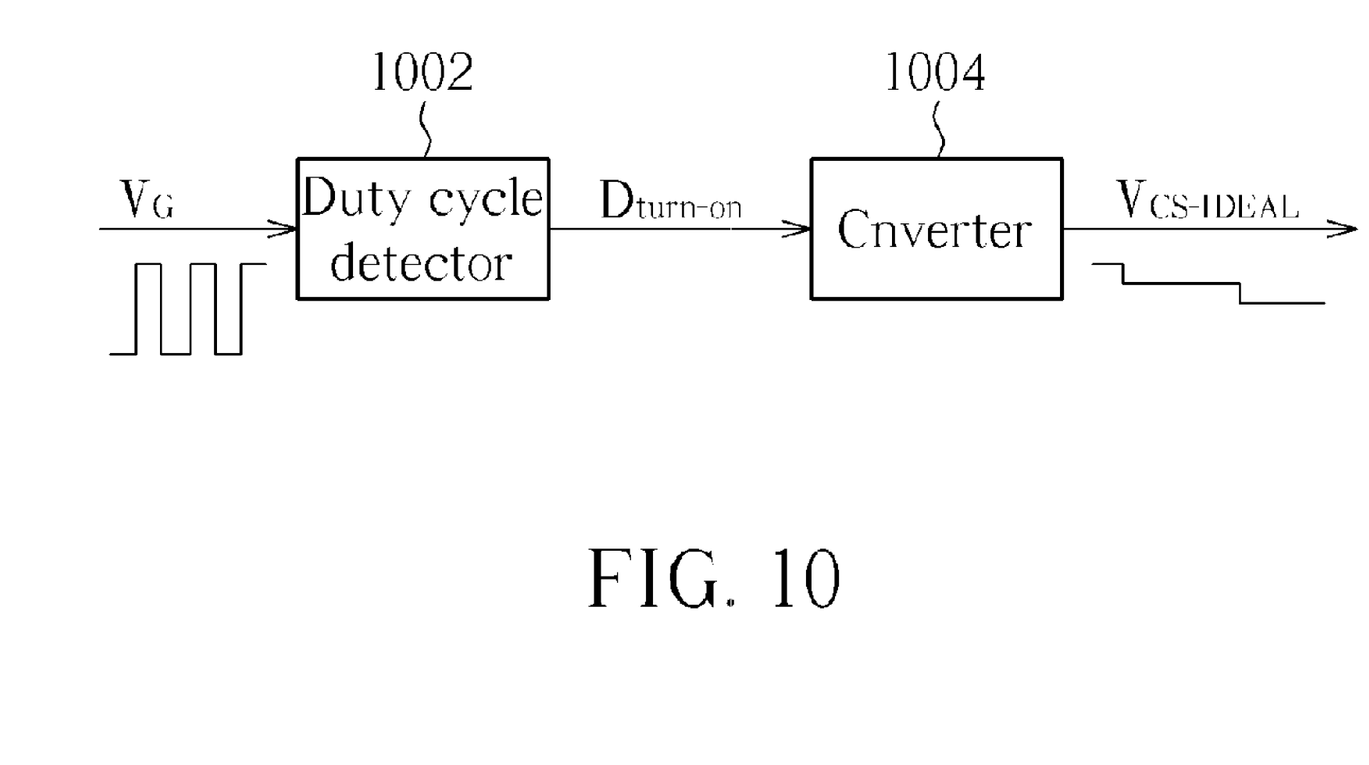
FIG. 10 is a schematic diagram showing a mechanism for generating the ideal current limit value $V_{CS\text{-}IDEAL}$ in accordance with another embodiment of the present invention.

FIG. 10 is a schematic diagram showing a mechanism for generating the ideal current limit value $V_{CS-IDEAL}$ in accordance with another embodiment of the present invention. Referring to FIG. 10, duty cycle detector 1002 is employed to generate a duty cycle $D_{turn-on}$ of the current period based on the control signal $V_G$ fetched from the control end of power switch 402. Converter 1004 functions to convert the duty cycle $D_{turn-on}$ into the ideal current limit value $V_{CS-IDEAL}$ for use in the subsequent period. For instance, when the duty cycle $D_{turn-on}$ is greater than 0.4, converter 1004 sets the ideal current limit value $V_{CS-IDEAL}$ equal to 0.85V; when the duty cycle $D_{turn-on}$ is less than 0.2, converter 1004 sets the ideal current limit value $V_{CS-IDEAL}$ equal to 0.75V; and when the duty cycle $D_{turn-on}$ falls into a range between 0.2 and 0.4, converter 1004 adjusts the ideal current limit value $V_{CS-IDEAL}$ linearly between 0.75V and 0.85V. As illustrated in FIG. 10, the ideal current limit value $V_{CS-IDEAL}$ is substantially unchanged while the power switch is turned on, and the ideal current limit value $V_{CS-IDEAL}$ is updated period by period.

It is noted that the embodiments of the present invention are not limited to be put in use for a flyback power converter. That is, the embodiments of the present invention can be applied to any functional circuit requiring a current limit signal provided for accurately limiting some circuit current to an ideal expected value.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A current control apparatus, comprising:
a current limiter electrically coupled to a switch, the switch being connected in series with an energy transfer element of a power supply, the current limiter detecting a current flowing through the switch and turning off the switch when the current exceeds a current limit signal; and
a limit signal generator for providing the current limit signal, detecting a maximum current value of the current, and updating the current limit signal according to the maximum current value and an ideal current limit value, the limit signal generator comprising:
a correction signal generator for generating a correction signal according to the current limit signal before updated, the maximum current value, and the ideal current limit value; and
a limit signal update unit for updating the current limit signal according to the correction signal, the limit signal update unit comprising:
a first capacitor having a first memory end for retaining the correction signal; and
a second capacitor having a second memory end for retaining the current limit signal;
wherein the limit signal update unit controls an electrical connection between the first memory end and the second memory end for updating the current limit signal;
wherein when the maximum current value of the current is higher than the ideal current limit value, the updated current limit signal is reduced.

2. The current control apparatus of claim 1, wherein the limit signal generator updates the current limit signal according to a resulted difference between the maximum current value and the ideal current limit value.

3. The current control apparatus of claim 1, wherein an update difference between the current limit signal before updated and an updated current limit signal is substantially proportional to a resulted difference between the maximum current value and the ideal current limit value with a fixed proportion k, and the fixed proportion k is within a range between 0 and 2.

4. The current control apparatus of claim 1, wherein the correction signal generator comprises:
 a peak value sampler for detecting the maximum current value of the current.

\* \* \* \* \*